United States Patent
Choi et al.

(10) Patent No.: US 11,062,849 B2
(45) Date of Patent: Jul. 13, 2021

(54) METHOD OF MANUFACTURING MULTILAYER CERAMIC ELECTRONIC COMPONENT AND MULTILAYER CERAMIC ELECTRONIC COMPONENT

(71) Applicant: SAMSUNG ELECTRO-MECHANICS CO., LTD., Suwon-si (KR)

(72) Inventors: Du Won Choi, Suwon-si (KR); Seok Kyoon Woo, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 149 days.

(21) Appl. No.: 16/204,903

(22) Filed: Nov. 29, 2018

(65) Prior Publication Data

US 2020/0111616 A1 Apr. 9, 2020

(30) Foreign Application Priority Data

Oct. 5, 2018 (KR) .................. 10-2018-0118729

(51) Int. Cl.
*H01G 4/30* (2006.01)
*H01G 4/012* (2006.01)
(Continued)

(52) U.S. Cl.
CPC .............. *H01G 4/30* (2013.01); *C01F 11/188* (2013.01); *H01G 4/012* (2013.01);
(Continued)

(58) Field of Classification Search
CPC .......... C04B 2235/3236; C04B 35/468; C04B 35/62842
See application file for complete search history.

(56) References Cited

U.S. PATENT DOCUMENTS

| | | | |
|---|---|---|---|
| 2011/0007449 A1 | 1/2011 | Seo et al. | |
| 2013/0094121 A1* | 4/2013 | Endo .................. | H01G 4/12 361/305 |

(Continued)

FOREIGN PATENT DOCUMENTS

| | | |
|---|---|---|
| JP | 2011-018874 A | 1/2011 |
| JP | 2014-220324 A | 11/2014 |
| KR | 10-2015-0114452 | 10/2015 |

*Primary Examiner* — Erin Snelting
(74) *Attorney, Agent, or Firm* — Morgan, Lewis & Bockius LLP

(57) ABSTRACT

A method of manufacturing a multilayer ceramic electronic component includes: preparing a dielectric magnetic composition including base material powder particles including $BaTi_2O_5$ or $(Ba_{(1-x)}Ca_x)Ti_2O_5$ ($0 \leq x < 0.1$), the base material powder particles having surfaces coated with one or more of Mg, Mn, V, Ba, Si, Al and a rare earth metal; preparing ceramic green sheets using dielectric slurry including the dielectric magnetic composition; applying an internal electrode paste to the ceramic green sheets; preparing a green sheet laminate by stacking the ceramic green sheets to which the internal electrode paste is applied; and preparing a ceramic body including dielectric layers and a plurality of first and second internal electrodes arranged to face each other with each of the dielectric layers interposed therebetween by sintering the green sheet laminate.

14 Claims, 4 Drawing Sheets

(51) Int. Cl.
    *H01G 4/12*          (2006.01)
    *H01G 4/232*       (2006.01)
    *C04B 35/468*     (2006.01)
    *C04B 35/628*     (2006.01)
    *C01F 11/18*      (2006.01)

(52) U.S. Cl.
    CPC ........... *H01G 4/1227* (2013.01); *H01G 4/232* (2013.01); *C04B 2237/704* (2013.01)

(56) References Cited

U.S. PATENT DOCUMENTS

| | | | | |
|---|---|---|---|---|
| 2013/0286541 A1* | 10/2013 | Kawamoto | .............. | H01C 7/10 361/321.4 |
| 2015/0122537 A1* | 5/2015 | Yamada | ................. | H01G 4/012 174/260 |
| 2015/0318110 A1* | 11/2015 | Lee | ......................... | H01G 4/30 361/301.4 |
| 2017/0178811 A1* | 6/2017 | Chun | ....................... | H01G 4/30 |
| 2017/0186536 A1* | 6/2017 | Sato | ....................... | C04B 35/638 |
| 2017/0190626 A1* | 7/2017 | Yoon | ................... | C04B 35/4686 |
| 2017/0213647 A1* | 7/2017 | Ahn | ....................... | H05K 1/181 |
| 2018/0022655 A1* | 1/2018 | Majima | ................ | H01G 4/1236 501/135 |

\* cited by examiner

METHOD OF MANUFACTURING MULTILAYER CERAMIC ELECTRONIC COMPONENT AND MULTILAYER CERAMIC ELECTRONIC COMPONENT

CROSS-REFERENCE TO RELATED APPLICATION(S)

This application claims the benefit of priority to Korean Patent Application No. 10-2018-0118729 filed on Oct. 5, 2018 in the Korean Intellectual Property Office, the disclosure of which is incorporated herein by reference in its entirety.

BACKGROUND

1. Field

The present disclosure relates to a method of manufacturing a multilayer ceramic electronic component and a multilayer ceramic electronic component, and more particularly, to a method of manufacturing a multilayer ceramic electronic component and a multilayer ceramic electronic component capable of having excellent reliability and a high capacitance.

2. Description of Related Art

Recently, in accordance with miniaturization, slimness, and multifunctionalization of electronic products, miniaturization of multilayer ceramic capacitors has also been required, and multilayer ceramic capacitors have also been mounted at a high degree of integration.

A multilayer ceramic capacitor, an electronic component, is mounted on a printed circuit boards of several electronic products including an image display device, for example, a liquid crystal display (LCD), a plasma display panel (PDP), and the like, a computer, a personal digital assistants (PDA), a cellular phone, and the like, to serve to charge or discharge electricity therein or therefrom.

The multilayer ceramic capacitor may be used as a component of various electronic apparatuses since it has a small size, implements high capacitance, and may be easily mounted.

Meanwhile, recently, in accordance with an increase in interest in electrical components in industry, multilayer ceramic capacitors have also been required to have high reliability and high capacitance characteristics in order to be used in a vehicle or an infotainment system.

Particularly, in accordance with an increase in an electronic control system of an internal combustion engine vehicle and an electric vehicle, demand for a multilayer ceramic capacitor that may be used in a high temperature environment has increased.

Currently, a dielectric material of a multilayer ceramic capacitor having a high capacitance is mainly barium titanate ($BaTiO_3$), and since nickel (Ni) internal electrodes are used and a ceramic body needs to be sintered under a reducing atmosphere, the dielectric material needs to have reduction resistance.

However, as capacitance is significantly decreased in an environment of 150° C. or more due to unique characteristics of barium titanate ($BaTiO_3$) oxide, it is difficult to secure electrical characteristics depending on a temperature required by electrical components.

In addition, it is impossible to use the multilayer ceramic capacitor in an environment up to 200° C. Therefore, the development of a multilayer ceramic capacitor that may be used even in a high temperature environment by applying a new composition has been required.

SUMMARY

An aspect of the present disclosure may provide a method of manufacturing a multilayer ceramic electronic component and a multilayer ceramic electronic component capable of having excellent reliability and having a high capacitance.

According to an aspect of the present disclosure, a method of manufacturing a multilayer ceramic electronic component may include: preparing a dielectric magnetic composition including base material powder particles represented by $BaTi_2O_5$ or $(Ba_{(1-x)}Ca_x)Ti_2O_5$ ($0 \leq x < 0.1$), the base material powder particles having surfaces coated with one or more of Mg, Mn, V, Ba, Si, Al and a rare earth metal; preparing ceramic green sheets using dielectric slurry including the dielectric magnetic composition; applying an internal electrode paste to the ceramic green sheets; preparing a green sheet laminate by stacking the ceramic green sheets to which the internal electrode paste is applied; and preparing a ceramic body including dielectric layers and a plurality of first and second internal electrodes arranged to face each other with each of the dielectric layers interposed therebetween by sintering the green sheet laminate.

According to another aspect of the present disclosure, a multilayer ceramic electronic component may include: a ceramic body including dielectric layers and a plurality of first and second internal electrodes arranged to face each other with each of the dielectric layers interposed therebetween and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and first and second external electrodes disposed on external surfaces of the ceramic body and electrically connected to the plurality of first and second internal electrodes, respectively, wherein each of the dielectric layers includes a dielectric magnetic composition including base material powder particles represented by $BaTi_2O_5$ or $(Ba_{(1-x)}Ca_x)Ti_2O_5$ ($0 \leq x < 0.1$), the base material powder particles having surfaces coated with one or more of Mg, Mn, V, Ba, Si, Al and a rare earth metal.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
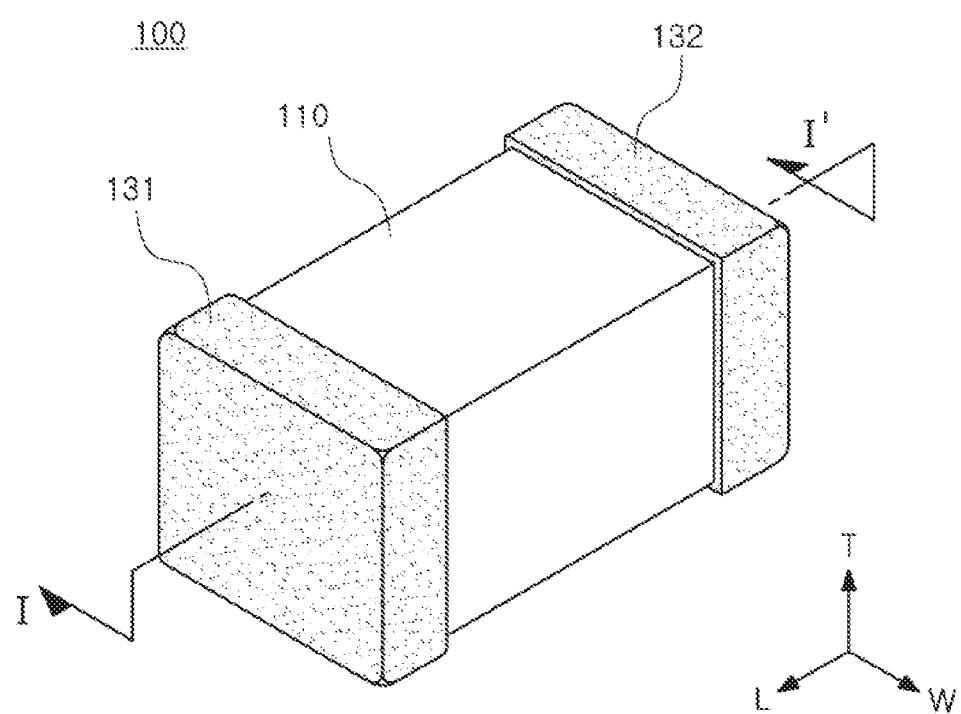
FIG. 1 is a perspective view illustrating a multilayer ceramic capacitor according to an exemplary embodiment in the present disclosure.

FIG. 1 is a perspective view illustrating a multilayer ceramic capacitor according to an exemplary embodiment in the present disclosure.

Figure 2:
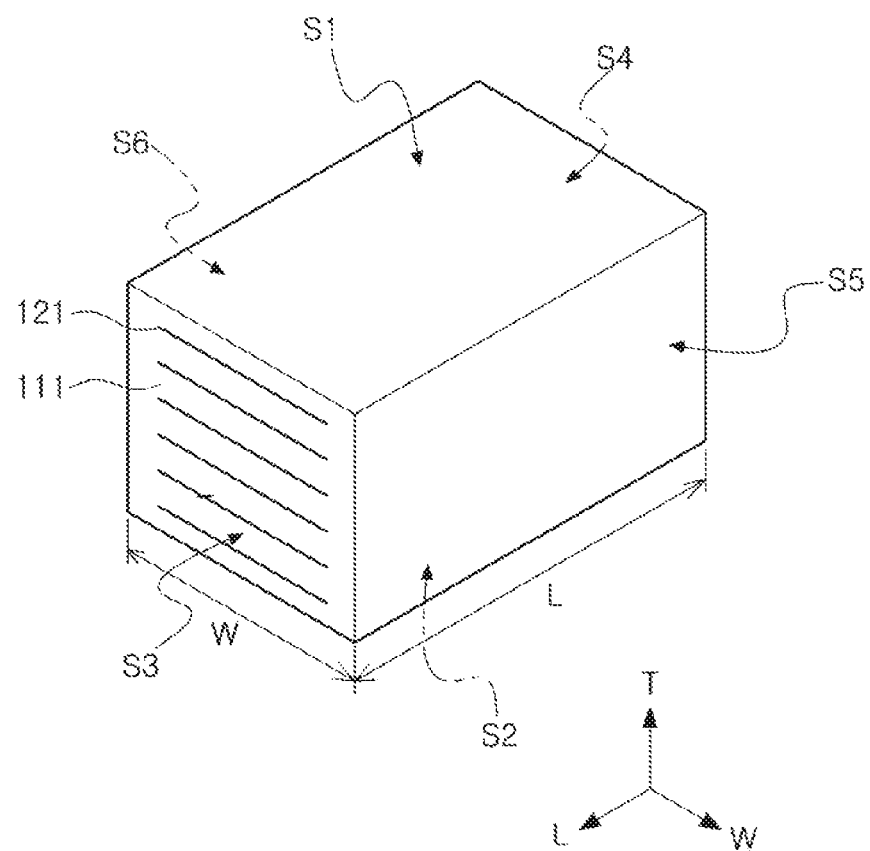
FIG. 2 is a schematic view illustrating a ceramic body according to an exemplary embodiment in the present disclosure.

FIG. 2 is a schematic view illustrating a ceramic body according to an exemplary embodiment in the present disclosure.

Figure 3:
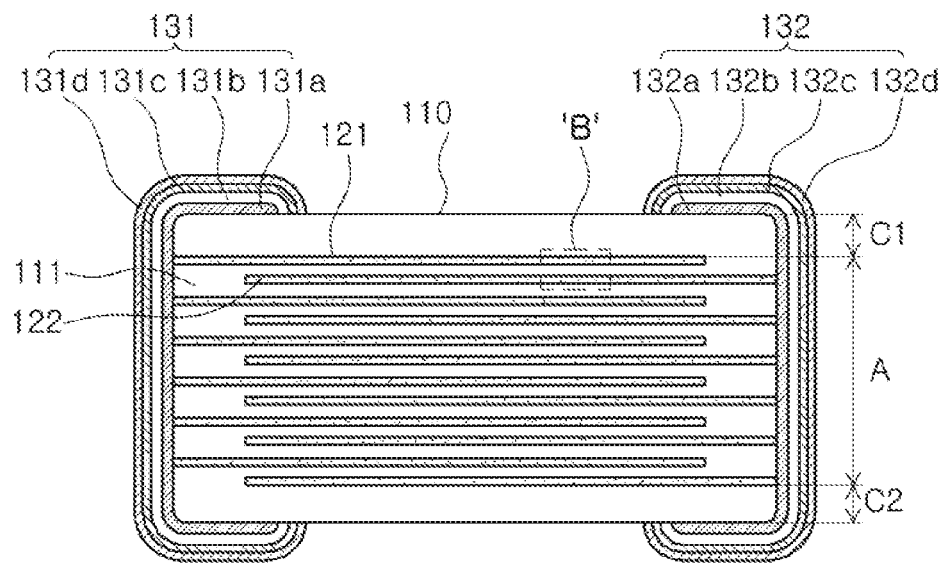
FIG. 3 is a cross-sectional view taken along line I-I' of FIG. 1 according to an exemplary embodiment in the present disclosure.
Figure 3:

FIG. 3 is a cross-sectional view taken along line I-I' of FIG. 1 according to an exemplary embodiment in the present disclosure.

Figure 4:
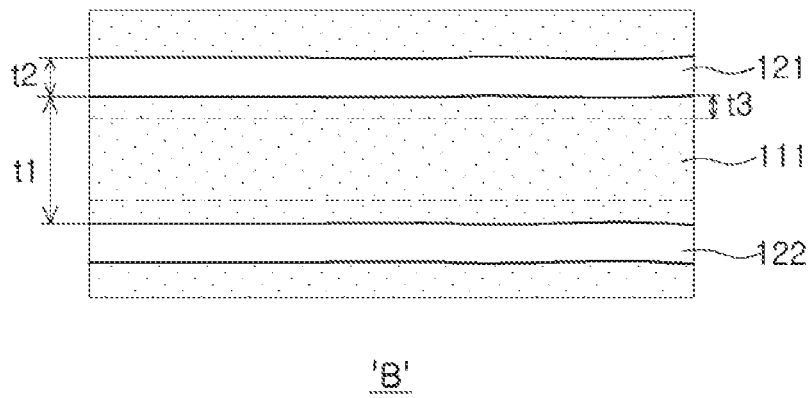
FIG. 4 is an enlarged view of region B of FIG. 3.

FIG. 4 is an enlarged view of region B of FIG. 3.

Referring to FIGS. 1 through 4, a multilayer ceramic electronic component 100 manufactured by a method of manufacturing a multilayer ceramic electronic component according to an exemplary embodiment in the present disclosure may include a ceramic body 110 including dielectric layers 111 and a plurality of first and second internal electrodes 121 and 122 arranged to face each other with each of the dielectric layers 111 interposed therebetween and having first and second surfaces S1 and S2 opposing each other in a first direction, third and fourth surfaces S3 and S4 connected to the first and second surfaces S1 and S2 and opposing each other in a second direction, and fifth and sixth surfaces S5 and S6 connected to the first to fourth surfaces and opposing each other in a third direction; and first and second external electrodes 131 and 132 disposed on external surfaces of the ceramic body 110 and electrically connected to the plurality of first and second internal electrodes 121 and 122, respectively.

A multilayer ceramic electronic component according to an exemplary embodiment in the present disclosure, particularly, a multilayer ceramic capacitor will hereinafter be described. However, the multilayer ceramic electronic component according to the present disclosure is not limited thereto.

In the multilayer ceramic capacitor according to an exemplary embodiment in the present disclosure, a 'length direction' refers to an 'L' direction of FIG. 1, a 'width direction' refers to a 'W' direction of FIG. 1, and a 'thickness direction' refers to a 'T' direction of FIG. 1. Here, the 'thickness direction' refers to a direction in which the dielectric layers are stacked, that is, a 'stacking direction'.

In an exemplary embodiment in the present disclosure, a shape of the ceramic body 110 is not particularly limited, and may be a hexahedral shape as illustrated.

The ceramic body 110 may have the first and second surfaces S1 and S2 opposing each other in the first direction, the third and fourth surfaces S3 and S4 connected to the first and second surfaces S1 and S2 and opposing each other in the second direction, and the fifth and sixth surfaces S5 and S6 connected to the first to fourth surfaces and opposing each other in the third direction.

The first and second surfaces S1 and S2 refer to surfaces of the ceramic body 110 opposing each other in the thickness direction, which is the first direction, the third and fourth surfaces S3 and S4 refer to surfaces of the ceramic body 110 opposing each other in the length direction, which is the second direction, and the fifth and sixth surfaces S5 and S6 refer to surfaces of the ceramic body 110 opposing each other in the width direction, which is the third direction.

One ends of the plurality of first and second internal electrodes 121 and 122 formed in the ceramic body 110 may be exposed to the third surface S3 or the fourth surface S4 of the ceramic body.

The internal electrodes 121 and 122 may have a pair of first and second internal electrodes 121 and 122 having different polarities.

One ends of the first internal electrodes 121 may be exposed to the third surface S3, and one ends of the second internal electrodes 122 may be exposed to the fourth surface S4.

The other ends of the first internal electrodes 121 and the second internal electrodes 122 may be formed to be spaced apart from the fourth surface S4 or the third surface S3 by a predetermined interval. More detailed contents for this will be described below.

The first and second external electrodes 131 and 132 may be formed on the third and fourth surfaces S3 and S4 of the ceramic body, respectively, and may be electrically connected to the internal electrodes.

The ceramic body 110 may include an active portion A contributing to forming capacitance of the multilayer ceramic capacitor, and upper and lower cover portions C1 and C2 formed as upper and lower margin portions on upper and lower surfaces of the active portion A, respectively.

The active portion A may be formed by repeatedly stacking a plurality of first and second internal electrodes 121 and 122 with each of the dielectric layers 111 interposed therebetween.

The upper and lower cover portions C1 and C2 may be formed of the same material as that of the dielectric layer 111 and have the same configuration as that of the dielectric layer 111 except that they do not include the internal electrodes.

That is, the upper and lower cover portions C1 and C2 may include a ceramic material such as a barium titanate ($BaTiO_3$)-based ceramic material.

The upper and lower cover portions C1 and C2 may be formed by stacking a single dielectric layer or two or more dielectric layers on the upper and lower surfaces of the active portion A, respectively, in a vertical direction, and may basically serve to prevent damage to the internal electrodes due to physical or chemical stress.

A material of each of the first and second internal electrodes 121 and 122 is not particularly limited, but may be a conductive paste including one or more of silver (Ag), lead (Pb), platinum (Pt), nickel (Ni), and copper (Cu).

According to an exemplary embodiment in the present disclosure, the multilayer ceramic capacitor may include the first external electrode 131 electrically connected to the first internal electrodes 121 and the second external electrode 132 electrically connected to the second internal electrodes 122.

The first and second external electrodes 131 and 132 may be electrically connected to the first and second internal electrodes 121 and 122, respectively, in order to form a capacitance, and the second external electrode 132 may be connected to a potential different to a potential to which the first external electrode 131 is connected.

The first and second external electrodes 131 and 132 may be disposed, respectively, on the third and fourth surfaces S3 and S4 of the ceramic body 110 in the length direction, which is the second direction, and may extend to the first and second surfaces S1 and S2 of the ceramic body 110 in the thickness direction, which is the first direction.

The external electrodes 131 and 132 may include, respectively, electrode layers 131a and 132a disposed on the external surfaces of the ceramic body 110 and electrically connected to the internal electrodes 121 and 122, respectively, and conductive resin layers 131b and 132b disposed on the electrode layers 131a and 132a, respectively.

The electrode layers 131a and 132a may include a conductive metal and a glass.

The conductive metal used in the electrode layers 131a and 132a may be any material that may be electrically connected to the internal electrodes in order to form the capacitance, for example, one or more selected from the group consisting of copper (Cu), silver (Ag), nickel (Ni), and alloys thereof.

The electrode layers 131a and 132a may be formed by applying and then sintering a conductive paste prepared by adding glass frit to conductive metal powder particles.

The conductive resin layers 131b and 132b may be formed on the electrode layers 131a and 132a, respectively, and may be formed to completely cover the electrode layers 131a and 132a, respectively.

Since the conductive resin layers 131b and 132b are formed to completely cover the electrode layers 131a and 132a, respectively, distances of the conductive resin layers 131b and 132b formed on the first and second surfaces S1 and S2 of the ceramic body 110 up to end portions may be greater than those of the electrode layers 131a and 132a formed on the first and second surfaces S1 and S2 of the ceramic body 110 up to the end portions.

A base resin included in each of the conductive resin layers 131b and 132b may have a bonding property and a shock absorbing property, may be any resin that may be mixed with conductive metal powder particles to form a paste, and may include, for example, an epoxy-based resin.

A conductive metal included in each of the conductive resin layers 131b and 132b may be any material that may be electrically connected to the electrode layers 131a and 132a, and may include, for example, one or more selected from the group consisting of copper (Cu), silver (Ag), nickel (Ni), and alloys thereof.

Plating layers 131c and 131d, and 132c and 132d may further be disposed on the conductive resin layers 131b and 132b, respectively.

The plating layers 131c and 131d, and 132c and 132d may be disposed on the conductive resin layers 131b and 132b, respectively, and be disposed to completely cover the conductive resin layers 131b and 132b, respectively.

The plating layers 131c and 131d, and 132c and 132d may include nickel (Ni) plating layers 131c and 132c disposed on the conductive resin layers 131b and 132b, respectively, and palladium (Pd) plating layers 131d and 132d disposed on the nickel (Ni) plating layers 131c and 132c, respectively.

The multilayer ceramic capacitor 100 may be manufactured by a method of manufacturing a multilayer ceramic electronic component according to an exemplary embodiment in the present disclosure. The method of manufacturing a multilayer ceramic electronic component according to an exemplary embodiment in the present disclosure may include preparing a dielectric magnetic composition including base material powder particles represented by $BaTi_2O_5$ or $(Ba_{(1-x)}Ca_x)Ti_2O_5$ (0≤x<0.1), the base material powder particles having surfaces coated with one or more of Mg, Mn, V, Ba, Si, Al and a rare earth metal; preparing ceramic green sheets using dielectric slurry including the dielectric magnetic composition; applying an internal electrode paste to the ceramic green sheets; preparing a green sheet laminate by stacking the ceramic green sheets to which the internal electrode paste is applied; and preparing a ceramic body including dielectric layers and a plurality of first and second internal electrodes arranged to face each other with each of the dielectric layers interposed therebetween by sintering the green sheet laminate.

Recently, in accordance with an increase in an interest in electrical components in the industry, the multilayer ceramic capacitors have also been required to have high reliability and high capacitance characteristics in order to be used in a vehicle or an infotainment system.

Particularly, in accordance with an increase in an electronic control system in an internal combustion engine vehicle and an electric vehicle, a demand for a multilayer ceramic capacitor that may be used in a high temperature environment has increased.

Currently, a dielectric material of a multilayer ceramic capacitor having a high capacitance is mainly barium titanate ($BaTiO_3$), and since nickel (Ni) internal electrodes are used and a ceramic body needs to be sintered under a reducing atmosphere, the dielectric material needs to have reduction resistance.

However, as a capacitance is significantly decreased in an environment of 150° C. or more due to unique characteristics of barium titanate ($BaTiO_3$) oxide, it is difficult to secure electrical characteristics depending on a temperature required by electrical components.

In addition, it is impossible to use the multilayer ceramic capacitor in an environment up to 200° C. Therefore, the development of a multilayer ceramic capacitor that may be used even in a high temperature environment by applying a new composition has been required.

According to an exemplary embodiment in the present disclosure, the multilayer ceramic capacitor may be manufactured using the dielectric magnetic composition including the base material powder particles represented by $BaTi_2O_5$ or $(Ba_{(1-x)}Ca_x)Ti_2O_5$ (0≤x<0.1) and having the surfaces coated with one or more of Mg, Mn, V, Ba, Si, Al and a rare earth metal, such that a high-temperature capacitance change rate may be stably secured and a high-capacitance multilayer ceramic capacitor may be implemented.

The respective components of the dielectric magnetic composition included in the dielectric layer according to an exemplary embodiment in the present disclosure will hereinafter be described in more detail.

a) Base Material Powder

According to an exemplary embodiment in the present disclosure, the dielectric magnetic composition may include the base material powder particles represented by $BaTi_2O_5$ or $(Ba_{(1-x)}Ca_x)Ti_2O_5$ (0≤x<0.1).

The dielectric magnetic composition may include the base material powder particles represented by $BaTi_2O_5$, may include the base material powder particles represented by $(Ba_{(1-x)}Ca_x)Ti_2O_5$ (0≤x<0.1), or may include a form in which the respective base material powder particles represented by $BaTi_2O_5$ and $(Ba_{(1-x)}Ca_x)Ti_2O_5$ (0≤x<0.1) are mixed with each other.

The base material powder represented by $BaTi_2O_5$ or $(Ba_{(1-x)}Ca_x)Ti_2O_5$ (0≤x<0.1) may have a ferroelectric transition temperature higher than that of $BaTiO_3$, which is a base material powder included in a general dielectric magnetic composition.

For example, $BaTi_2O_5$ may be controlled to have a ferroelectric transition temperature up to 470° C., and $(Ba_{(1-x)}Ca_x)Ti_2O_5$ may be controlled to have a ferroelectric transition temperature of 220 to 470° C.

Therefore, when the base material powder particles represented by $BaTi_2O_5$ or $(Ba_{(1-x)}Ca_x)Ti_2O_5$ (0≤x<0.1) are used as a main component, a high-temperature capacitance change rate may be stably secured by high ferroelectric transition temperature characteristics.

However, when the base material powder particles represented by $BaTi_2O_5$ or $(Ba_{(1-x)}Ca_x)Ti_2O_5$ ($0 \leq x < 0.1$) are used as the main component, an amount of titanium (Ti) may be larger than that of $BaTiO_3$ according to the related art, such that a problem that titanium (Ti) reacts with nickel (Ni) constituting the internal electrode and nickel (Ni) is diffused into the dielectric layer occurs.

In detail, since a larger amount of $TiO_2$ than that of $BaTiO_3$ is added at the time of synthesizing $BaTi_2O_5$ or $(Ba_{(1-x)}Ca_x)Ti_2O_5$, unreacted $TiO_2$ or a Ti-rich secondary phase may remain after the synthesis.

Since the unreacted $TiO_2$ or the Ti-rich secondary phase has a high reactivity to nickel (Ni) included in the internal electrode, nickel (Ni) may be diffused into the dielectric layer, and in a severe case, a problem that the internal electrode disappears may occur.

Therefore, there may be a problem that a dielectric constant of the multilayer ceramic capacitor is decreased.

That is, when the base material powder particles represented by $BaTi_2O_5$ or $(Ba_{(1-x)}Ca_x)Ti_2O_5$ ($0 \leq x < 0.1$) are used as the main component, the high-temperature capacitance change rate may be stably secured by the high ferroelectric transition temperature characteristics, but the problem that the dielectric constant of the multilayer ceramic capacitor is decreased may occur.

Therefore, in order to stably secure the high-temperature capacitance change rate and implement the high-capacitance multilayer ceramic capacitor, in an exemplary embodiment in the present disclosure, the dielectric magnetic composition may include the base material powder particles represented by $BaTi_2O_5$ or $(Ba_{(1-x)}Ca_x)Ti_2O_5$ ($0 \leq x < 0.1$) and having the surfaces coated with one or more of Mg, Mn, V, Ba, Si, Al and a rare earth metal.

In detail, one or more of Mg, Mn, V, Ba, Si, Al and a rare earth metal may be coated on the surfaces of the base material powder particles represented by $BaTi_2O_5$ or $(Ba_{(1-x)}Ca_x)Ti_2O_5$ ($0 \leq x < 0.1$) to prevent a contact between nickel (Ni) and titanium (Ti) in a heat treatment process to thus solve the problem that nickel (Ni) is diffused into the dielectric layer or the internal electrode disappears.

That is, the base material powder particles having the surfaces coated with one or more of Mg, Mn, V, Ba, Si, Al and a rare earth metal may prevent formation of a Ti—Ni reaction layer by reaction to the internal electrode including nickel (Ni) to increase a dielectric constant.

In addition, the Ti—Ni reaction layer may be decreased to solve problems such as an increase in a dissipation factor (DF), a decrease in a specific resistance, and the like.

Meanwhile, one or more of Mg, Mn, V, Ba, Si, Al and a rare earth metal may be coated on the surfaces of the base material powder particles in a content of 2 parts by mol or less based on 100 parts by mol of Ti of elements of the base material powder particles.

One or more of Mg, Mn, V, Ba, Si, Al and a rare earth metal may be coated on the surface of the base material powder particles in the content of 2 parts by mol or less based on 100 parts by mol of Ti of the elements of the base material powder particles to prevent the contact between nickel (Ni) and titanium (Ti) in the heat treatment process to thus prevent the problem that nickel (Ni) is diffused into the dielectric layer or the internal electrode disappears, such that the high-temperature capacitance change rate may be stably secured and the high-capacitance multilayer ceramic capacitor may be implemented.

When one or more of Mg, Mn, V, Ba, Si, Al and a rare earth element are coated on the surfaces of the base material powder particles in a content exceeding 2 parts by mol or less based on 100 parts by mol of Ti of the elements of the base material powder particles, it may be difficult to stably secure the high-temperature capacitance change rate, such that it may be difficult to use the multilayer ceramic capacitor at a high temperature.

The rare earth element may be one or more selected from the group consisting of Y, Dy, Ho, La, Ce, Nd, Sm, Gd, and Er, but is not necessarily limited thereto.

Meanwhile, in the base material powder particles represented by $(Ba_{(1-x)}Ca_x)Ti_2O_5$ ($0 \leq x < 0.1$), $0 \leq x < 0.1$.

That is, in a first main component, Ca may include 0 mol %, and may be included in a content less than 10 mol %.

More preferably, in the first main component, Ca may include 0 mol %, and may be included in a content of 7 mol % or less. Therefore, $0 \leq x \leq 0.7$.

x may be 0 or more, and when x is 0, the first main component may be $BaTi_2O_5$.

The base material powder particles are not particularly limited, and may have an average particle size of 150 nm or less.

b) First Accessory Component

According to an exemplary embodiment in the present disclosure, the dielectric magnetic composition may further include an oxide or a carbonate including at least one of Mn, V, Cr, Fe, Ni, Co, Cu, and Zn as a first accessory component.

A content of the oxide or the carbonate including at least one of Mn, V, Cr, Fe, Ni, Co, Cu and Zn, which is included as the first accessory component, may be 0.1 to 2.0 mol % based on 100 mol % of the base material powder particles.

The first accessory component may serve to decrease a sintering temperature of a multilayer ceramic capacitor in which the dielectric magnetic composition is used and to improve high-temperature withstand voltage characteristics of the multilayer ceramic capacitor.

The content of the first accessory component and a content of a second accessory component to be described below may be contents based on 100 mol % of the base material powder particles, and may be defined particularly as mol % of metal ions included in the respective accessory components.

When the content of the first accessory component is less than 0.1 mol %, a sintering temperature of the multilayer ceramic capacitor may be increased and high-temperature withstand voltage characteristics of the multilayer ceramic capacitor may be deteriorated to some degree.

When the content of the first accessory component is 2.0 mol % or more, high-temperature withstand voltage characteristics and a room-temperature specific resistance of the multilayer ceramic capacitor may be deteriorated.

Particularly, the dielectric magnetic component according to an exemplary embodiment in the present disclosure may further include the first accessory component having the content of 0.1 to 2.0 mol % based on 100 mol % of the base material powder particles. Therefore, the multilayer ceramic capacitor may be sintered at a low temperature, and the high-temperature withstand voltage characteristics of the multilayer ceramic capacitor may be obtained.

c) Second Accessory Component

According to an exemplary embodiment in the present disclosure, the dielectric magnetic composition may include an oxide including Si or a glass compound including Si, as a second accessory component.

The dielectric magnetic composition may further include the second accessory component which is the oxide including Si or the glass compound including Si and has a content of 0.2 to 5.0 mol % based on 100 mol % of the base material powder particles.

The second accessory component may serve to decrease a sintering temperature of the multilayer ceramic capacitor in which the dielectric magnetic composition is used and to improve high-temperature withstand voltage characteristics of the multilayer ceramic capacitor.

When the content of the second accessory component is less than 0.2 mol % based on 100 mol % of the base material powder particles, the sintering temperature of the multilayer ceramic capacitor may be increased.

When the content of the second accessory component is 5.0 mol % or more based on 100 mol % of the base material powder particles, the high-temperature withstand voltage characteristics of the multilayer ceramic capacitor may be deteriorated.

Particularly, the dielectric magnetic component according to an exemplary embodiment in the present disclosure may further include the second accessory component having the content of 0.2 to 5.0 mol % based on 100 mol % of the base material powder particles. Therefore, the multilayer ceramic capacitor may be sintered at a low temperature, and the high-temperature withstand voltage characteristics of the multilayer ceramic capacitor may be obtained.

d) Third Accessory Component

According to an exemplary embodiment in the present disclosure, the dielectric magnetic composition may further include a third accessory component, which is an oxide, a carbonate, or a fluoride including Li.

The dielectric magnetic composition may further include the third accessory component which is the oxide, the carbonate, or the fluoride including Li and has a content of 0.4 to 12.0 mol % based on 100 mol % of the base material powder particles.

The third accessory component may serve to decrease a sintering temperature of the multilayer ceramic capacitor in which the dielectric magnetic composition is used and to improve high-temperature withstand voltage characteristics of the multilayer ceramic capacitor.

In addition, the third accessory component may obtain target characteristics of the multilayer ceramic capacitor even in a case in which copper (Cu) is used as a material of the internal electrode.

When the content of the third accessory component is less than 0.4 mol % based on 100 mol % of the base material powder particles, a sintering temperature of the multilayer ceramic capacitor may be increased, a dielectric constant of the multilayer ceramic capacitor may be low, and the high-temperature withstand voltage characteristics of the multilayer ceramic capacitor may be deteriorated.

When the content of the third accessory component is 12.0 mol % or more based on 100 mol % of the base material powder particles, the high-temperature withstand voltage characteristics of the multilayer ceramic capacitor may be deteriorated due to generation of a secondary phase, or the like.

Particularly, the dielectric magnetic component according to an exemplary embodiment in the present disclosure may further include the third accessory component having the content of 0.4 to 12.0 mol % based on 100 mol % of the base material powder particles. Therefore, copper (Cu) may be used as the material of the internal electrode, the multilayer ceramic capacitor may be sintered at a low temperature, and the high-temperature withstand voltage characteristics of the multilayer ceramic capacitor may be obtained.

e) Fourth Accessory Component

According to an exemplary embodiment in the present disclosure, the dielectric magnetic composition may further include a fourth accessory component, which is an oxide, a carbonate, or a fluoride including Ba.

The dielectric magnetic composition may further include the fourth accessory component which is the oxide, the carbonate, or the fluoride including Ba of which a content is 0 to 3.0 at % based on 100 mol % of the base material powder particles.

The fourth accessory component may serve to increase a dielectric constant of the multilayer ceramic capacitor in which the dielectric magnetic composition is used.

In addition, the fourth accessory component may obtain target characteristics of the multilayer ceramic capacitor even in a case in which copper (Cu) is used as a material of the internal electrode and the multilayer ceramic capacitor is sintered under a reducing atmosphere ($N_2$ atmosphere).

When the content of Ba of the fourth accessory component exceeds 3.0 at % based on 100 mol % of the base material powder particles, the high-temperature withstand voltage characteristics of the multilayer ceramic capacitor may be deteriorated.

Particularly, the dielectric magnetic component according to an exemplary embodiment in the present disclosure may further include the fourth accessory component which is the oxide, the carbonate, or the fluoride including Ba of which the content is 0 to 3.0 at % based on 100 mol % of the base material powder. Therefore, copper (Cu) may be used as the material of the internal electrode, the multilayer ceramic capacitor may be sintered under the reducing atmosphere, and the high dielectric constant and the high-temperature withstand voltage characteristics of the multilayer ceramic capacitor may be obtained.

Meanwhile, according to an exemplary embodiment in the present disclosure, the fourth accessory component may include Ba so that a molar ratio between Ba and Si is 0 to 4.0.

When a molar ratio between the second accessory component including the oxide including Si or the glass compound including Si and the fourth accessory component is controlled to satisfy 0 to 4.0, a high dielectric constant of the multilayer ceramic capacitor may be obtained, and excellent high-temperature withstand voltage characteristics of the multilayer ceramic capacitor may be obtained.

In detail, even in a case in which the content of Ba of the fourth accessory component, which is the oxide, the carbonate, or the fluoride including Ba, exceeds 3.0 at %, when the molar ratio between Ba and Si is controlled to be 4.0 by increasing a content of Si, which is the second accessory component, the high-temperature withstand voltage characteristics of the multilayer ceramic capacitor may be improved.

However, when the molar ratio between Ba and Si exceeds 4.0, the withstand voltage characteristics of the multilayer ceramic capacitor may be deteriorated, and a problem may occur in reliability.

f) Fifth Accessory Component

According to an exemplary embodiment in the present disclosure, the dielectric magnetic composition may include a fifth accessory component, which is an oxide, a carbonate, or a fluoride including at least one of Dy, Y, Ho, Sm, Gd, Er, La, and Tb.

The dielectric magnetic composition may further include the fifth accessory component which is the oxide, the carbonate, or the fluoride including at least one of Dy, Y, Ho, Sm, Gd, Er, La, and Tb each of which a content is 0 to 4.0 at % based on 100 mol % of the base material powder particles.

The fifth accessory component may serve to improve direct current (DC) bias characteristics of the multilayer ceramic capacitor in which the dielectric magnetic composition is used and to improve a high-temperature withstand voltage of the multilayer ceramic capacitor to improve reliability.

When the content of each element of the fifth accessory component exceeds 4.0 at % based on 100 mol % of the base material powder particles, a room-temperature dielectric constant may be decreased to implement target characteristics.

Particularly, the dielectric magnetic composition according to an exemplary embodiment in the present disclosure may further include the fifth accessory component which is the oxide, the carbonate, or the fluoride including at least one of Dy, Y, Ho, Sm, Gd, Er, La, and Tb each of which a content is 0 to 4.0 at % based on 100 mol % of the base material powder particles. Therefore, the DC bias characteristics of the multilayer ceramic capacitor may be improved, and the high-temperature withstand voltage may be increased to improve the reliability.

In the method of manufacturing a multilayer ceramic electronic component according to an exemplary embodiment in the present disclosure, the dielectric magnetic composition including the base material powder particles represented by $BaTi_2O_5$ or $(Ba_{(1-x)}Ca_x)Ti_2O_5$ ($0 \leq x < 0.1$) and having the surfaces coated with one or more of Mg, Mn, V, Ba, Si, Al and a rare earth metal may first be prepared.

As the base material powder particles represented by $BaTi_2O_5$ or $(Ba_{(1-x)}Ca_x)Ti_2O_5$ ($0 \leq x < 0.1$), powder particles having an average particle size of 150 nm or less may be used.

A method of coating one or more of Mg, Mn, V, Ba, Si, Al and a rare earth metal on the surfaces of the base material powder particles is not particularly limited, and may be performed by, for example, performing heat treatment on the base material powder particles co-doped with one or more of Mg, Mn, V, Ba, Si, Al and a rare earth metal at 1200° C., and wet-milling and then drying the base material powder particles formed after the heat treatment.

An additive such as Sn, Mn, or the like, a binder, and an organic solvent such as ethanol, or the like, are added to and wet-mixed with the coated base material powder particles, to prepare dielectric slurry. Then, the dielectric slurry are applied and dried onto carrier films to form a plurality of ceramic green sheets.

Therefore, dielectric layers may be formed.

Next, a conductive paste for an internal electrode including 40 to 50 parts by weight of nickel powder particles having an average particle size of 0.1 to 0.2 μm may be prepared.

The conductive paste for an internal electrode is applied onto the ceramic green sheets by a screen printing method to form the internal electrodes, the ceramic green sheets on which internal electrode patterns are disposed are stacked to form a green sheet laminate, and the green sheet laminate is then compressed and cut.

Then, the cut green sheet laminate is heated to remove the binder and is sintered under a high-temperature reducing atmosphere to form a ceramic body.

The ceramic body may include dielectric layers and a plurality of first and second internal electrodes arranged to face each other with each of the dielectric layers interposed therebetween.

In the sintering process, the sintering is performed under a reducing atmosphere (an atmosphere of 0.1% $H_2$/99.9% $N_2$ and $H_2O/H_2/N_2$).

Then, electrode layers including one or more conductive metals selected from the group consisting of copper (Cu), silver (Ag), nickel (Ni), and alloys thereof, and a glass may be formed on external surfaces of the ceramic body.

The glass is not particularly limited, but may be a material having the same composition as that of a glass used to manufacture an external electrode of a general multilayer ceramic capacitor.

The electrode layers may be formed on upper and lower surfaces and end portions of the ceramic body to be electrically connected to the first and second internal electrodes, respectively.

The electrode layer may include 5% by volume or more of glass relative to the conductive metal.

Then, the conductive resin layers 131b and 132b may be formed by applying a conductive resin composition to the electrode layers 131a and 132a and then hardening the conductive resin composition.

The conductive resin layer 131b and 132b may include one or more conductive metals selected from the group consisting of copper (Cu), silver (Ag), nickel (Ni), and alloys thereof, and a base resin. The base resin may be an epoxy resin.

Then, the nickel (Ni) plating layers 131c and 132c may be formed on the conductive resin layers 131b and 132b, respectively, and the palladium (Pd) plating layers 131d and 132d may be formed on the nickel (Ni) plating layers 131c and 132c, respectively.

A multilayer ceramic electronic component 100 according to another exemplary embodiment in the present disclosure may include a ceramic body 110 including dielectric layers 111 and a plurality of first and second internal electrodes 121 and 122 arranged to face each other with each of the dielectric layers 111 interposed therebetween and having first and second surfaces S1 and S2 opposing each other in a first direction, third and fourth surfaces S3 and S4 connected to the first and second surfaces S1 and S2 and opposing each other in a second direction, and fifth and sixth surfaces S5 and S6 connected to the first to fourth surfaces and opposing each other in a third direction; and first and second external electrodes 131 and 132 disposed on external surfaces of the ceramic body 110 and electrically connected to the plurality of first and second internal electrodes 121 and 122, respectively, wherein each of the dielectric layers 111 includes a dielectric magnetic composition including base material powder particles represented by $BaTi_2O_5$ or $(Ba_{(1-x)}Ca_x)Ti_2O_5$ ($0 \leq x < 0.1$), the base material powder particles having surfaces coated with one or more of Mg, Mn, V, Ba, S Al and a rare earth metal.

Referring to FIG. 4, t2>t3 in which t3 is a thickness of a region of the dielectric layer 111 in which a content of nickel (Ni) is 3 wt % or less from a boundary of each of the first and second internal electrodes 121 and 122 and t2 is a thickness of each of the first and second internal electrodes 121 and 122.

According to the present exemplary embodiment, the surfaces of the base material powder particles including $BaTi_2O_5$ or $(Ba_{(1-x)}Ca_x)Ti_2O_5$ ($0 \leq x < 0.1$) may be coated with one or more of Mg, Mn, V, Ba, Si, Al and a rare earth metal, and the thickness t3 of the region of the dielectric layer 111 in which the content of nickel (Ni) is 3 wt % or less may thus be smaller than the thickness t2 of each of the first and second internal electrodes 121 and 122.

As described above, a problem that nickel (Ni) is diffused into the dielectric layer may be significantly suppressed to prevent a decrease in a dielectric constant, such that a high-capacitance multilayer ceramic capacitor may be implemented.

Referring to FIG. 4, in the multilayer ceramic electronic component according to another exemplary embodiment in the present disclosure, t1>2×t2 in which t1 is a thickness of the dielectric layer 111 and t2 is the thickness of each of the internal electrodes 121 and 122.

That is, according to another exemplary embodiment in the present disclosure, the thickness t1 of the dielectric layer 111 may be greater than two times the thickness t2 of each of the internal electrodes 121 and 122.

Generally, in a high-voltage electrical component, a reliability problem depending on a decrease in a break-down voltage under a high voltage environment may be important.

In the multilayer ceramic capacitor according to another exemplary embodiment in the present disclosure, the thickness t1 of the dielectric layer 111 may be set to be greater than two times the thickness t2 of each of the internal electrodes 121 and 122 in order to prevent a decrease in a break-down voltage under a high voltage environment. That is, the thickness of the dielectric layer, which is a distance between the internal electrodes, may be increased to improve break-down voltage characteristics.

When the thickness t1 of the dielectric layer 111 is equal to or less than two times the thickness t2 of each of the internal electrodes 121 and 122, the thickness of the dielectric layer, which is the distance between the internal electrodes, may be small, such that a break-down voltage may be decreased.

The thickness t2 of the internal electrode may be less than 2 μm, and the thickness t1 of the dielectric layer may be less than 10.0 μm. However, the thickness t2 of the internal electrode and the thickness t1 of the dielectric layer are not necessarily limited thereto.

Figure 5:
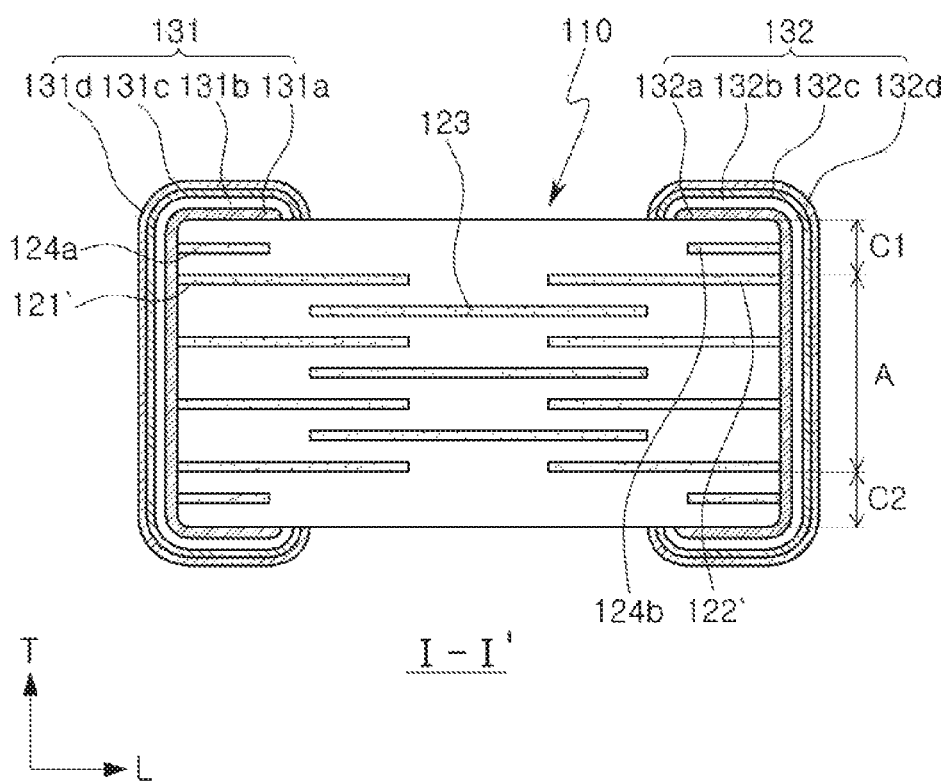
FIG. 5 is a cross-sectional view taken along line I-I' of FIG. 1 according to another exemplary embodiment in the present disclosure.

FIG. 5 is a cross-sectional view taken along line I-I' of FIG. 1 according to another exemplary embodiment in the present disclosure.

Referring to FIG. 5, a multilayer ceramic capacitor according to the present exemplary embodiment may further include a plurality of floating electrodes 123 arranged in the ceramic body 110 to be offset from the first and second internal electrodes 121' and 122' in the thickness direction and having opposite end portions overlapping, respectively, portions of the first and second internal electrodes 121' and 122'.

The first and second internal electrodes 121' and 122', which have different polarities, may be simultaneously formed on at least one surfaces of ceramic sheets forming the dielectric layers 111 to be spaced apart from each other, and may be arranged in the ceramic body 110 to be exposed through opposite end surfaces of the ceramic body 110, respectively.

The first and second internal electrodes 121' and 122' exposed through the opposite end surfaces of the ceramic body 110, respectively, may be electrically connected to the first and second external electrodes 131 and 132, respectively.

The plurality of floating electrodes 123 and the first and second internal electrodes 121' and 122' may be arranged in the ceramic body 110 to be offset from each other in the thickness direction of the ceramic body 110, and portions of opposite end portions of the plurality of floating electrodes 123 may overlap, respectively, end portions of the first and second internal electrodes 121' and 122' spaced apart from each other.

Each of distances at which the plurality of floating electrodes 123 are spaced apart from the opposite end surfaces of the ceramic body 110 may be 5% or more of an entire length of the ceramic body 110.

Meanwhile, according to another exemplary embodiment in the present disclosure, first and second dummy electrodes 124a and 124b spaced apart from each other may be arranged in an upper cover portion C1 and a lower cover portion C2 disposed, respectively, on upper and lower surfaces of an active portion A.

The first dummy electrodes 124a may be exposed to the same surface as an external surface of the ceramic body 110 to which the first internal electrodes 121' are exposed, and the second dummy electrodes 124b may be exposed to the same surface as an external surface of the ceramic body 110 to which the second internal electrodes 122' are exposed.

The first dummy electrodes 124a may be exposed to the same surface as the external surface of the ceramic body 110 to which the first internal electrodes 121' are exposed, and the second dummy electrodes 124b may be exposed to the same surface as the external surface of the ceramic body 110 to which the second internal electrodes 122' are exposed, such that warpage strength of the multilayer ceramic capacitor may be improved.

As set forth above, according to an exemplary embodiment in the present disclosure, the multilayer ceramic capacitor may be manufactured using the dielectric magnetic composition including the base material powder particles including $BaTi_2O_5$ or $(Ba_{(1-x)}Ca_x)Ti_2O_5$ ($0 \leq x < 0.1$) and having the surfaces coated with one or more of Mg, Mn, V, Ba, Si, Al and a rare earth metal, such that a high-temperature capacitance change rate may be stably secured and a high-capacitance multilayer ceramic capacitor may be implemented.

While exemplary embodiments have been shown and described above, it will be apparent to those skilled in the art that modifications and variations could be made without departing from the scope of the present invention as defined by the appended claims.

What is claimed is:

1. A method of manufacturing a multilayer ceramic electronic component, comprising:
   preparing a dielectric magnetic composition including base material powder particles including $BaTi_2O_5$ or $(Ba_{(1-x)}Ca_x)Ti_2O_5$ ($0 \leq x < 0.1$), the base material powder particles having surfaces coated with at least one selected from the group of Mg, Mn, V, Ba, Si, Al and a rare earth metal;
   preparing ceramic green sheets using dielectric slurry including the dielectric magnetic composition;
   applying an internal electrode paste to the ceramic green sheets;
   preparing a green sheet laminate by stacking the ceramic green sheets to which the internal electrode paste is applied; and
   preparing a ceramic body including dielectric layers and a plurality of first and second internal electrodes arranged to face each other with each of the dielectric layers interposed therebetween by sintering the green sheet laminate,
   wherein a region of one of the dielectric layers having a content of nickel (Ni) from a boundary of one of the first and second internal electrodes immediately adjacent to the one of the dielectric layers is formed by sintering, and t2>t3, where t3 is a thickness of the region of the one of the dielectric layers in which the content of nickel (Ni) is 3 wt % or less from the boundary of the one of the first and second internal electrodes immediately adjacent to the one of the dielectric layers, and t2 is a thickness of the one of the first and second internal electrodes immediately adjacent to the one of the dielectric layers.

2. The method of claim 1, wherein a content of the at least one selected from the group of Mg, Mn, V, Ba, Si, Al and a rare earth metal is 2 parts by mol or less based on 100 parts by mol of Ti of elements of the base material powder particles.

3. The method of claim 1, wherein the base material powder particles have surfaces coated with the rare earth metal, and the rare earth metal includes at least one selected from the group consisting of Y, Dy, Ho, La, Ce, Nd, Sm, Gd, and Er.

4. The method of claim 1, wherein $0 \leq x \leq 0.07$.

5. The method of claim 1, wherein the one of dielectric layers has a thickness less than 10.0 μm.

6. The method of claim 1, wherein the one of the first and second internal electrodes has a thickness less than 2 μm.

7. The method of claim 1, wherein t1>2×t2 in which t1 is a thickness of the one of the dielectric layers.

8. The method of claim 1, wherein a plurality of floating electrodes are further arranged in the ceramic body to be offset from the first and second internal electrodes in a thickness direction, and have opposite end portions overlapping, respectively, portions of the first and second internal electrodes.

9. The method of claim 1, wherein the ceramic body includes an active portion including the plurality of first and second internal electrodes disposed to face each other and cover portions formed on upper and lower surfaces of the active portion, respectively, and first and second dummy electrodes are arranged in the cover portions to be spaced apart from each other.

10. The method of claim 9, wherein the first dummy electrodes are exposed to the same surface as a surface of the ceramic body to which the first internal electrodes are exposed, and the second dummy electrodes are exposed to the same surface as a surface of the ceramic body to which the second internal electrodes are exposed.

11. The method of claim 1, further comprising, after the preparing of the ceramic body, forming external electrodes on external surfaces of the ceramic body.

12. The method of claim 11, wherein the external electrodes include electrode layers electrically connected to the first and second internal electrodes, conductive resin layers disposed on the electrode layers, and plating layers disposed on the conductive resin layers, respectively.

13. The method of claim 12, wherein the plating layers include nickel (Ni) plating layers disposed on the conductive resin layers and palladium (Pd) plating layers disposed on the nickel (Ni) plating layers, respectively.

14. The method of claim 1, wherein the base material powder particles have an average particle size of 150 nm or less.

* * * * *